(Model.)
R. P. SCOTT.
Peach Pitting Machine.
No. 242,701. Patented June 7, 1881.
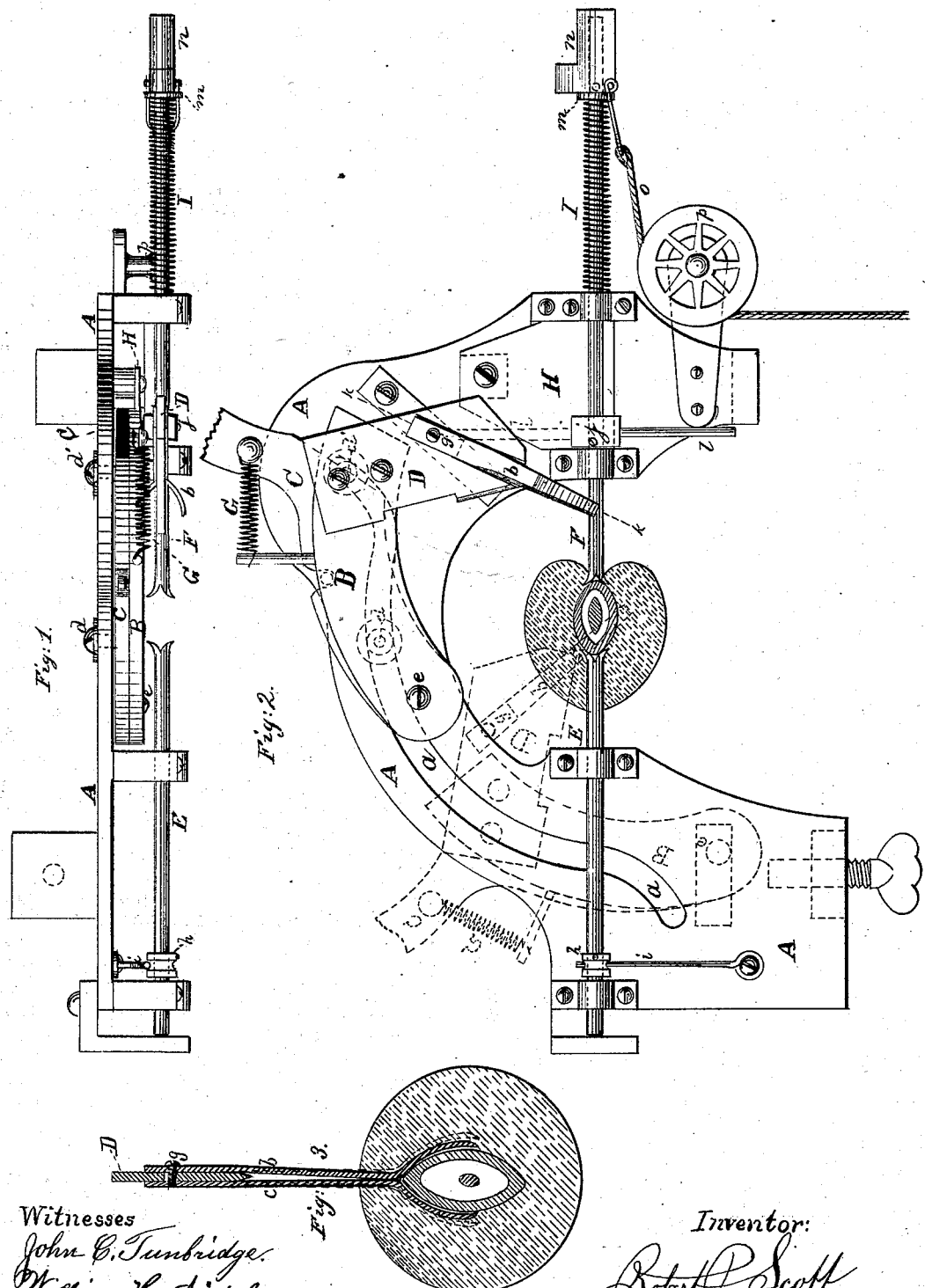
Witnesses
John C. Tunbridge.
William H. Nichols
Inventor:
Robert P. Scott

UNITED STATES PATENT OFFICE.

ROBERT P. SCOTT, OF NEWARK, NEW JERSEY.

PEACH-PITTING MACHINE.

SPECIFICATION forming part of Letters Patent No. 242,701, dated June 7, 1881.

Application filed April 18, 1881. (Model.)

*To all whom it may concern:*

Be it known that I, ROBERT P. SCOTT, a citizen of the United States, residing at Newark, in the county of Essex and State of New Jersey, have invented a new and useful Peach-Pitting Machine, of which the following is a specification.

My invention relates to improvements in peach-pitting machines in which a frame supports mechanism for grasping the pit; also, a knife-carriage provided with knives for halving the peach and cutting it loose from the pit.

The object of my invention is to produce a machine with which the pit can be removed from peaches quickly and without bruising or mutilating the fruit, and with little or no waste.

My invention consists of a grooved or slotted frame upon which a carriage works provided with knives of peculiar construction for entering and cutting the meat loose from the pit and halving the peach; also, of centers for grasping the pit and means for operating the same.

The invention could be said to consist of the mechanism described hereinafter and shown in the drawings, in which—

Figure 1 is a plan view of my peach-pitting machine. Fig. 2 is a front elevation of same. Fig. 3 is an enlarged detailed sectional view of knives $c$ $b$ on line $k$ $k$.

All the implements heretofore made or in use for the purpose specified seem to be impracticable, for reasons following. If the peach is held in the hand while the pit is being cut out with a knife of any kind, the fruit is compressed or mutilated, especially if a little soft, and considerable waste occurs from not being able to follow the surface of different sizes of or irregularly-shaped pits, besides the danger of cutting the hands.

In my machine there is a frame, A, which is clamped fast to a table by means of a thumb-screw, and is provided with a slot, $a$, which determines the course in which the knife-carriage B C moves, and said frame holds the center rods, E F, which grasp the pit.

The knife-carriage is composed of two plates, B and C. Plate C slides on the face of the frame A, and is connected therewith by means of two suitable pins or screws, $d$ $d'$, which pass through and have washers on the other side of slot, and rollers are also placed on said pins, so as to reduce the friction and cause the carriage B C to slide easily from end to end of and in the general direction of the slot $a$. The plate B swings upon a pivot, $e$, which forms the connection between plates B and C. A spring, G, having one end attached to plate B and the other end to plate C, causes the plate B to bear toward the pit of the peach held between the centers E and F.

To the plate B of the knife-carriage is rigidly attached the knife D, which cuts the peach in half, near the end of which knife is a slotted recess made to receive the supplemental or pitting knives $c$ and $b$. These knives serve to cut the meat loose from the pit, and are attached to the halving-knife D by a screw, $g$, passing through a hole in the solid part back of the recess in which the knives $b$ $c$ lie. The two knives $b$ $c$ are made of steel, each about half the thickness of the halving-knife D; hence the surfaces come flush on either side, except when the pitting-knives $b$ $c$ are sprung apart to receive a large pit, as hereinafter described, except, also, where they spread out and over the halving-knife D to receive the screw $g$. The pitting-knives $b$ and $c$ extend beyond the cutting-edge of the halving-knife D, and then spread apart so as to extend over and follow the surface of the pit, each knife extending about half-way across the pit from edge to edge at its widest part, as shown in Fig. 3. By the above arrangement the pitting-knives are made long, so that they can spring apart and pass over a large pit, as shown by dotted line, Fig. 3. Hence it is seen that while they keep close to a small pit they will adjust themselves to a large pit, cutting the meat close in all cases with equal facility.

To complete the adjustment of the knives to the pit it is necessary to have them yield to the width of the pit, as well as the thickness thereof. This is accomplished by the swinging of the plate B, to which the knife D is attached, the whole being pressed toward the pit and following the edge of same as the carriage travels in its course, as previously described.

The rods E and F, for holding the pit of the peach, lie in bearings or lugs which form part of the frame A. The rod E is held in place by means of a square block, h, which has a hole through it, through which the rod E passes, the two being secured together by a screw. The block h has a groove cut across each side, in which lies the end of a spring, i, the object of which is to keep the rod E in either one of the four similar positions as it revolves in its bearings. The object is merely that the operator may know how the points stand which are intended to hold the ends of the pit, said points being formed by splitting the rods a short distance and spreading the ends apart. The other rod, F, has a similar contrivance to keep it in position by the flat steel plate H bearing against the flat side of the block j'. A handle, l, is attached to block j', by means of which the rod F is turned in its bearings half-way around and then back to the first position. The rod F is cut and spread into points, same as rod E; hence it is evident that when the pit is grasped by the ends between the two rods and the one rod F is turned partly around by the handle, as shown in Fig. 2, dotted lines, as above described, the two rods and the peach all turn together, thereby presenting the opposite part of the peach to be cleared from the seed and cut in half. To the rod F is given a reciprocating movement in addition to that above mentioned, the block j' sliding back and forward against the spring-plate H, the object of which is evident. The outer end of the rod F is incased in a spiral spring, I, one end resting against the frame A and the other against a washer and pin. By this means the rod F is pushed back, releasing the pit, and is drawn forward to grasp the pit by means of a cap, n, to which a cord, o, is attached, running over the pulley p and downward, with a treadle or stirrup attached thereto to be operated by the foot.

The cord o is slackened and the rod F springs back, making the opening between the ends of the two center rods enough to allow of the peach being placed between them, which is placed in such position as to bring the ends of the pit toward the center rods, E and F, and the edge toward the halving-knife D, the general shape of the peach being such as to easily determine the position of the pit therein. It is put in this position because it is generally preferred to halve the peach the flat way of the pit, and the pitting-knives b and c are shaped so as to accommodate themselves to the peach in this position. The rod F is then drawn forward, grasping the pit. The hand is then placed on the handle, extending upward from plate C of the knife-carriage, which is then drawn toward the left end of slot a, when the knife D strikes or approaches the rod E, as shown in dotted lines, Fig. 2. Then the carriage is pushed back to its resting-place at the right end of the slot a. The peach is then turned half-way around by means of lever or handle, and the same movement applied to the knife-carriage as before, which being completed the meat drops from the pit in halves, the pit remaining in the machine until released by the rod F.

A simple modification of my machine would be to have the frame A a full incline and a set of knives and carriage operated from two opposite sides of the peach. By this arrangement the turning of the peach around would be dispensed with. I prefer the plan adopted in the present application, as it is more simple and about as quickly worked.

In most of the machines for pitting fruit made heretofore the center rods or other mechanism for grasping or driving the pit stand in a vertical position. In none of these, or any of those having the center rods placed in a horizontal position, do the parts of the peach or the juice drop entirely clear of the machine. This is a serious objection to their use, as would be found in practical work. I have so arranged my machine in all its parts, together with the use of the center rods placed in a horizontal line, that no part of the fruit can come in contact with any part of the machine as it drops therefrom.

What I claim is—

1. In a peach-pitting machine, the combination of the frame A and knife carriage B C, the former provided with a slot, a, for directing the course of the latter, substantially as described.

2. The spring pitting-knives b c, the ends being formed to fit the contour of the stone, in combination with a halving-knife, D, the former attached to the latter at a point back of the cutting-edge, substantially as described.

3. The carriage B C, consisting of plates B and C and spring G, in combination with knives D b c, substantially as described.

4. The spring pitting-knives b c and knife D, in combination with the center rods, E F, for grasping the pit, substantially as described.

5. The sliding center rod, F, in combination with spring I and cap n, fitting loosely over said rod, substantially as described.

6. The combination of the frame A, knife-carriage B C, knives D b c, center rods, E F, cap n, spring I, and cord o, substantially as described.

ROBERT P. SCOTT.

Witnesses:
LOUIS A. SAYRE,
JOHN J. COWELL.